(12) United States Patent  
Xiao et al.

(10) Patent No.: US 7,689,033 B2  
(45) Date of Patent: Mar. 30, 2010

(54) ROBUST MULTI-VIEW FACE DETECTION METHODS AND APPARATUSES

(75) Inventors: Rong Xiao, Suzhou (CN); Long Zhu, Los Angeles, CA (US); Lei Zhang, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 10/621,260

(22) Filed: Jul. 16, 2003

(65) Prior Publication Data

US 2005/0013479 A1    Jan. 20, 2005

(51) Int. Cl.
  *G06K 9/00* (2006.01)
  *G06K 9/62* (2006.01)
  *G06K 9/46* (2006.01)
  *G06K 9/40* (2006.01)

(52) U.S. Cl. ............... 382/159; 382/118; 382/195; 382/260

(58) Field of Classification Search ............... 382/118, 382/159, 195, 260
See application file for complete search history.

(56) References Cited

U.S. PATENT DOCUMENTS

2003/0128877 A1*  7/2003  Nicponski ........... 382/224
2006/0088894 A1*  4/2006  Wright et al. ........ 435/7.23

OTHER PUBLICATIONS

Al et al, a subsoace approach to face detection with support vector machines, 2002 IEEE, p. 45-48.*

Rowley, Henry A et al, Neural Network-Based Face Detection, Jan. 1998, PAME IEEE, all pages.*
Schapire, et al; "The Boosting Approach to Machine Learning an Overview"; MSRI Workshop on Nonlinear Estimation and Classification, 2002; pp. 1-23, Dec. 19, 2001.
Viola, et al; "Robust Real-time Object Detection"; Second International Workshop on Statistical and Computational Therories of Vision—Modeling, Learning, Computing, and Sampling; Vancouver, Canada, Jul. 13, 2001; pp. 1-25.
Serre, et al.; "Feature Selection for Face Detection"; Massachusetts Institute of Technology, Sep. 2000; A.I. Memo No. 1697; C.B.C.L. Paper No. 192; 17 pages.
Roth, et al; "A SNoW-Based FAce Detector"; University of Illinois at Urbana-Champaign, Urbana, IL 61801; 7 pages.
Schneiderman et al; "A Statistical Method for 3D Object Detection Applied to Faces and Cars"; Carnegie Mellon University, Pittsburgh, PA 15213.

* cited by examiner

*Primary Examiner*—Bhavesh M Mehta
*Assistant Examiner*—Kathleen S Yuan
(74) *Attorney, Agent, or Firm*—Lee & Hayes, PLLC

(57) ABSTRACT

Face detection techniques are provided that use a multiple-stage face detection algorithm. An exemplary three-stage algorithm includes a first stage that applies linear-filtering to enhance detection performance by removing many non-face-like portions within an image, a second stage that uses a boosting chain that is adopted to combine boosting classifiers within a hierarchy "chain" structure, and a third stage that performs post-filtering using image pre-processing, SVM-filtering and color-filtering to refine the final face detection prediction. In certain further implementations, the face detection techniques include a two-level hierarchy in-plane pose estimator to provide a rapid multi-view face detector that further improves the accuracy and robustness of face detection.

68 Claims, 6 Drawing Sheets

ROBUST MULTI-VIEW FACE DETECTION METHODS AND APPARATUSES

TECHNICAL FIELD

This invention relates to computers and software, and more particularly to methods, apparatuses and systems for use in detecting one or more faces within a digital image.

BACKGROUND OF THE INVENTION

Human face detection continues to be a challenging problem in the field of computer/machine vision, due in part to the number of variations that can be caused by differing facial appearances, facial expressions, skin colors, lighting, etc.

Such variations result in a face data distribution that is highly nonlinear and complex in any space which is linear to the original image space. Moreover, for example, in the applications of real life surveillance and biometric processing, the camera limitations and pose variations make the distribution of human faces in feature space more dispersed and complicated than that of frontal faces. Consequently, this further complicates the problem of robust face detection.

Frontal face detection has been studied for decades. As a result, there are many frontal face detection algorithms. By way of example, some conventional systems employ classifiers that are built based on a difference feature vector that is computed between a local image pattern and a distribution-based model. Some systems use detection techniques based on an over-complete wavelet representation of an object class. Here, for example, a dimensionality reduction can be performed to select the most important basis function, and then trained a Support Vector Machine (SVM) employed to generate a final prediction.

Some conventional systems utilize a network of linear units. The SNoW learning architecture, for example, is specifically tailored for learning in the presence of a very large number of binary features. In certain systems, fast frontal face detection has been shown possible by using a cascade of boosting classifiers that is built on an over-complete set of Haar-like features that integrates the feature selection and classifier design in the same framework.

Most conventional non-frontal face detectors tend to use a view-based method, in which several face models are built, each describing faces in a given range of view. This is typically done to avoid explicit three-dimensional (3D) modeling. In one conventional system, the views of a face are partitioned into five channels, and a multi-view detector is developed by training separate detector networks for each view. There have also been studies of trajectories of faces in linear PCA feature spaces as they rotate, and SVMs have been used for multi-view face detection and pose estimation.

Other conventional systems have used multi-resolution information in different levels of a wavelet transform, wherein an array of two face detectors are implemented in a view-based framework. Here, for example, each detector can be constructed using statistics of products of histograms computed from examples of the respective view. Until now, this type system appears to have achieved the best detection accuracy; however, it is often very slow due to computation complexity.

To address the problem of slow detection speed, it has been proposed that a coarse-to-fine, simple-to-complex pyramid structure can be used to essentially combine the ideas of a boosting cascade and view-based methods. Although, this approach improves the detection speed, it still has several problems. For example, as the system computation cost is determined by the complexity and false alarm rates of classifiers in the earlier stage. As each boosting classifier works separately, the useful information between adjacent layers is discarded, which hampers the convergence of the training procedure. Furthermore, during the training process, more and more non-face samples collected by bootstrap procedures are introduced into the training set, which tends to increase the complexity of the classification. Indeed, it has been found that in certain systems the last stage pattern distribution between face and non-face can become so complicated that the patterns may not even be distinguished by Haar-like features.

Additionally, view-based methods tend to suffer from the problems of high computation complexity and low detection precision.

Thus, there is a need for improved methods, apparatuses and systems for use in face detection.

SUMMARY OF THE INVENTION

In accordance with certain aspects of the present invention, improved methods, apparatuses and systems are provided for use in face detection.

In accordance with certain exemplary implementations of the present invention, face detection techniques are provided that use a multiple-step (e.g., three-step) face detection algorithm or the like, which adopts a simple-to-complex strategy for processing an input image (e.g., digital image data). For example, in accordance with certain three-step algorithms a first step or stage applies linear-filtering to enhance detection performance by removing many non-face-like portions within an image. The second step or stage includes using a boosting chain that is adopted to combine boosting classifiers within a hierarchy "chain" structure. By utilizing inter-layer discriminative information, a hierarchy chain structure improves efficiency when compared to traditional cascade approaches. The third step or stage provides post-filtering, wherein image pre-processing, SVM-filtering and color-filtering are applied to refine the final face detection prediction.

In certain further implementations, such multiple-step/stage approaches are combined with a two-level hierarchy in-plane pose estimator to provide a rapid multi-view face detector that further improves the accuracy and robustness of face detection.

Thus, the above stated needs and others are met, for example, by a method for use in detecting a face within a digital image. The method includes processing a set of initial candidate portions of digital image data in a boosting filter stage that uses a boosting chain to produce a set of intermediate candidate portions, and processing the set of intermediate candidate portions in a post-filter stage to produce a set of final candidate portions, wherein most faces are likely to be.

In certain implementations, the method further includes processing the plurality of portions using a pre-filter stage that is configured to output the set of initial candidate portions selected from the plurality of portions based on at least one Haar-like feature. The pre-filter stage may also include a linear filter, for example, one that is based on a weak learner. In certain exemplary implementations, the linear filter is based on a decision function having coefficients that are determined during a learning procedure.

In accordance with certain exemplary implementations, the boosting chain includes a serial of boosting classifiers which are linked into a hierarchy "chain" structure. In this structure, each node of this "Chain" corresponds to a boosting classifier that predicts negative patterns with high confidence, and each classifier is used to initialize its successive classifier.

Therefore, there are multiple exits for negative patterns in this structure, and the samples passed the verification of every classifier will be classified as positive patterns.

In certain further exemplary implementations, the boosting filter stage may include an LSVM optimization that is configured to determine a global maximum subject to certain constraints and coefficients set according to a classification risk and/or trade-off constant over a training set.

The post-filter stage may also include image pre-processing process, color-filter process and SVM filter process. During the image pre-processing process, a lighting correction process and a histogram equalization process are used to alleviate image variations.

The method in certain implementations also includes performing in-plane estimation to predict orientation of the face image data. Thereafter, face detection can be done by applying an up-right detector to the pre-rotated images which is corresponding to the orientation prediction.

As part of certain methods, the SVM filter process is configured to reduce redundancy in a feature space associated with at least one intermediate candidate portion by performing wavelet transformation of the intermediate candidate portion to produce a plurality of sub-bands portions. In certain implementations, such methods also benefit by selectively cropping at least one of the plurality of sub-band portions.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Exemplary Computing Environment

Figure 1:
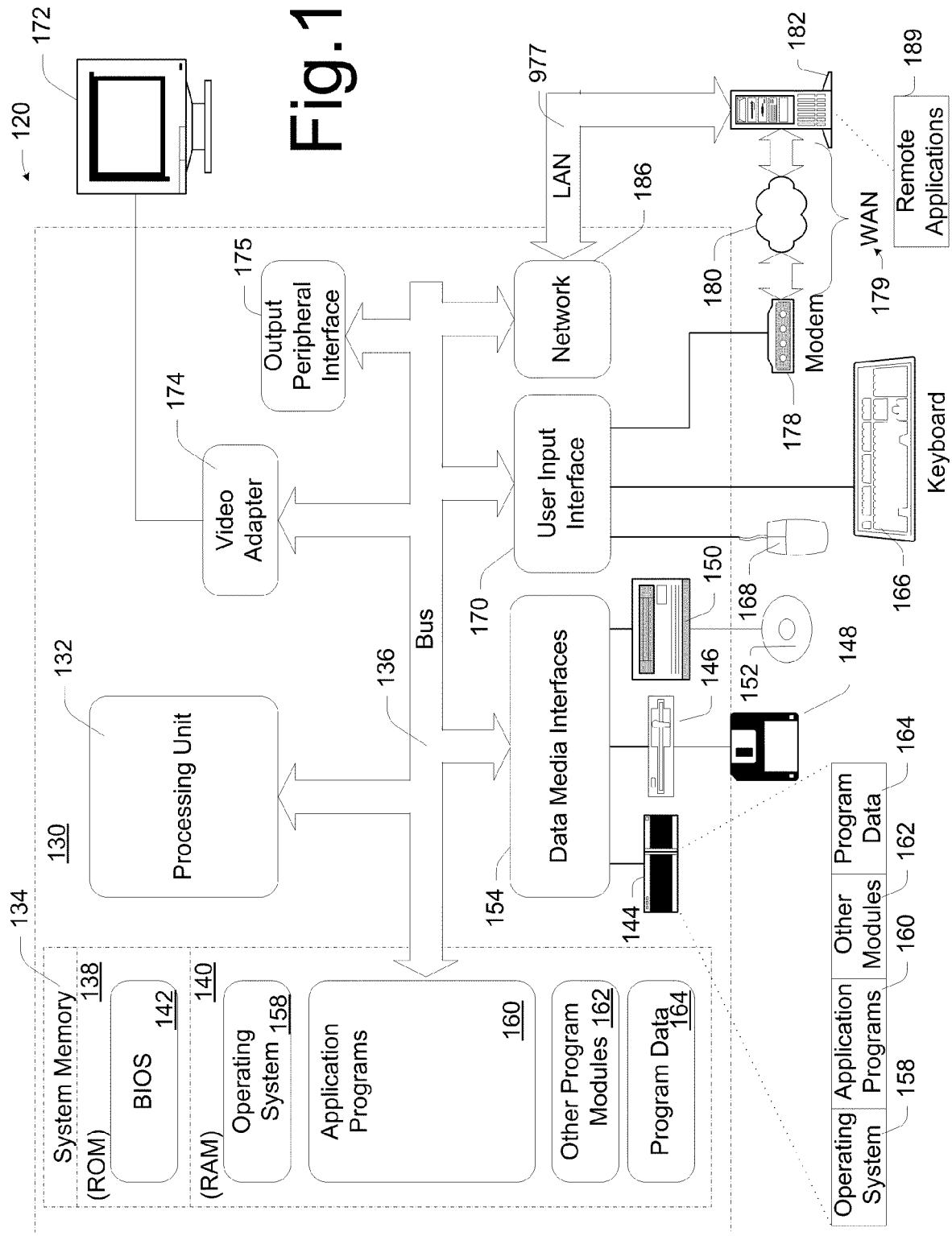
FIG. 1 is a block diagram depicting an exemplary computer system suitable for use performing the novel algorithm in logic, in accordance with certain exemplary implementations of the present invention.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated 11 graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Face Detection

Figure 2:
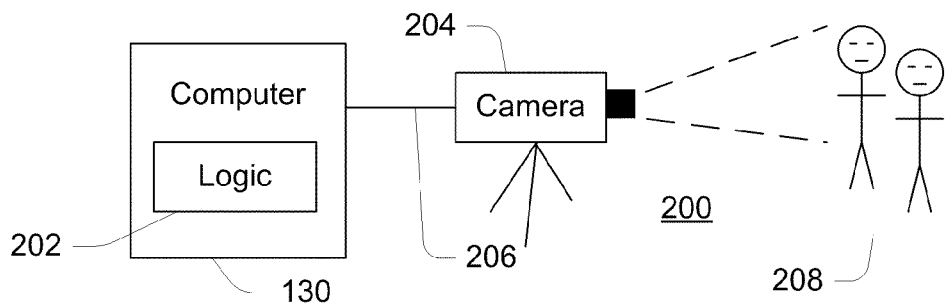
FIG. 2 is an illustrative diagram depicting an exemplary system configured to detect one or more faces, in accordance with certain implementations of the present invention.

Exemplary System Arrangement:

Reference is made to FIG. 2, which is a block diagram depicting an exemplary system 200 that is configured to detect one or more faces, in accordance with certain implementations of the present invention.

System 200 includes logic 202, which is illustrated in this example as being operatively configured within computer 130. Those skilled in the art will recognize that all or part of logic 202 may be implemented in other like devices.

System 200 further includes a camera 206 that is capable of providing digital image data to logic 202 through an interface 206. Camera 204 may include, for example, a video camera, a digital still camera, and/or any other device that is capable of capturing applicable image information for use by logic 202. In certain implementations, the image information includes digital image data. Analog image information may also be captured and converted to corresponding digital image data by one or more components of system 200. Such cameras and related techniques are well known. As illustratively shown, camera 204 is capable of capturing images that include subjects 208 (e.g., people and more specifically their faces).

Interface 206 is representative of any type(s) of communication interfaces/resources that can be configured to transfer the image information and any other like information as necessary between camera 204 and logic 202. In certain implementations, the image information includes digital image data. As such, for example, interface 206 may include a wired interface, a wireless interface, a transportable computer-readable medium, a network, the Internet, etc.

REFERENCES

Attention is drawn to the references listed below. Several of these references are referred to by respective listing number in this description:

[1] A. Pentland, B. Moghaddam, and T. Starner. "View-based and Modular Eigenspaces of Face Recognition". Proc. of IEEE Computer Soc. Conf. on Computer Vision and Pattern Recognition, pp. 84-91, June 1994. Seattle, Wash.

[2] C. P. Papageorgiou, M. Oren, and T. Poggio. "A general framework for object detection". Proc. of International Conf. on Computer Vision, 1998.

[3] D. Roth, M. Yang, and N. Ahuja. "A snowbased face detection". Neural Information Processing, 12, 2000.

[4] E. Osuna, R. Freund, and F. Girosi. "Training support vector machines:an application to face detection". Proc. IEEE Computer Soc. Conf. on Computer Vision and Pattern Recognition, 1997.

[5] F. Fleuret and D. Geman. "Coarse-to-fine face detection". International Journal of Computer Vision 20 (2001) 1157-1163.

[6] H. Schneiderman and T. Kanade. "A Statistical Method for 3D Object Detection Applied to Faces and Cars". Proc. IEEE Computer Soc. Conf. on Computer Vision and Pattern Recognition, 2000.

[7] H. A. Rowley, S. Baluja, and T. Kanade. "Neural network-based face detection". IEEE Transactions on Pattern Analysis and Machine Intelligence 20 (1998), pages 22-38.

[8] H. A. Rowley. Neural Network-Based Face Detection, Ph. D. thesis. CMU-CS-99-117.

[9] J. Ng and S. Gong. "Performing multi-view face detection and pose estimation using a composite support vector machine across the view sphere". Proc. IEEE International Workshop on Recognition, Analysis, and Tracking of Faces and Gestures in Real-Time Systems, pages 14-21, Corfu, Greece, September 1999.

[10] M. Bichsel and A. P. Pentland. "Human face recognition and the face image set's topology". CVGIP: Image Understanding, 59:254-261, 1994.

[11] P. Viola and M. Jones. "Robust real time object detection". IEEE ICCV Workshop on Statistical and Computational Theories of Vision, Vancouver, Canada, Jul. 13, 2001.

[12] R. E. Schapire. "The boosting approach to machine learning: An overview". MSRI Workshop on Nonlinear Estimation and Classification, 2002.

[13] R. L. Hsu, M. Abdel-Mottaleb, and A. K. Jain, "Face Detection in Color Images," IEEE Trans. on Pattern Analysis and Machine Intelligence Vol. 24, No. 5, pp 696-706, 2002.

[14] S. Z. Li, et al. "Statistical Learning of Multi-View Face Detection". Proc. of the 7th European Conf. on Computer Vision. Copenhagen, Denmark. May, 2002.

[15] T. Poggio and K. K. Sung. "Example-based learning for view-based human face detection". Proc. of the ARPA Image Understanding Workshop, II: 843-850. 1994.

[16] T. Serre, et al. "Feature selection for face detection". AI Memo 1697, Massachusetts Institute of Technology, 2000.

[17] V. N. Vapnik. Statistical Learning Theory. John Wiley and Sons, Inc., New york, 1998.

[18] Y. Freund and R. E. Schapire. "A decision-theoretic generalization of on-line learning and an application to boosting". Journal of Computer and System Sciences, 55(1):119-139, August 1997.

Introduction to Multi-Pose Face Detection

Methods, apparatuses and systems will now be described that provide for rapid multi-pose face detection.

In accordance with certain aspects of the present invention, face detection techniques are provided that use a multiple-step (e.g., three-step) face detection algorithm or the like, which adopts a simple-to-complex strategy for processing an input image (e.g., digital image data). For example, in accordance with certain three-step algorithms a first step or stage applies linear-filtering to enhance detection performance by removing many non-face-like portions within an image. The second step or stage includes using a boosting chain that is adopted to combine boosting classifiers within a hierarchy "chain" structure. By utilizing inter-layer discriminative information, for example, a hierarchy chain structure improves efficiency when compared to traditional cascade approaches. The third step or stage provides post-filtering, for example, wherein image pre-processing, SVM-filtering and color-filtering are applied to refine the final face detection prediction.

Typically, only a small amount of a candidate portion of the image remains in the last stage. This novel algorithm significantly improves the detection accuracy without incurring significant computation costs. Moreover, when compared with conventional approaches, the multiple-step approaches described herein tend to be much more effective and capable at handling different pose variations.

In certain further implementations, such multiple-step/stage approaches are combined with a two-level hierarchy in-plane pose estimator to provide a rapid multi-view face detector that further improves the accuracy and robustness of face detection.

Those skilled in the art will recognize that face detection has many uses. For example, face detection can be useful in media analysis and intelligent user interfaces. Automatic face recognition, face tracking, extraction of region of interest in images (ROI), and/or other like capabilities would prove useful to a variety of other systems. A description of all of the various uses for such capabilities is beyond the scope of this description.

Face detection has been regarded as a challenging problem in the field of computer vision, due to the large intra-class variations caused by the changes in facial appearance, lighting, and expression. Such variations result in the face distribution that is highly nonlinear and complex in any space which is linear to the original image space [10]. Moreover, for example, in the applications of real life surveillance and biometric, the camera limitations and pose variations make the distribution of human faces in feature space more dispersed and complicated than that of frontal faces. Consequently, this further complicates the problem of robust face detection.

Frontal face detection has been studied for decades. By way of example, Sung and Poggio [15] built a classifier based on a difference feature vector that is computed between the local image pattern and the distribution-based model. Papageorgiou [2] developed a detection technique based on an over-complete wavelet representation of an object class. Here, for example, A dimensionality reduction can be performed to select the most important basis function, and then trained a Support Vector Machine (SVM) [17] to generate final prediction. Roth [3] used a network of linear units. The SNoW learning architecture is specifically tailored for learning in the presence of a very large number of features. Viola and Jones [11], for example, developed a fast frontal face detection system wherein a cascade of boosting classifiers is built on an over-complete set of Haar-like features that integrates the feature selection and classifier design in the same framework.

Most conventional non-frontal face detectors tend to use a view-based method [1], in which several face models are built, each describing faces in a given range of view. This is typically done to avoid explicit 3D modeling. Rowley et al. [7] partitioned the views of a face into five channels, and developed a multi-view detector by training separate detector networks for each view. Ng and Gong [9] studied the trajectories of faces in linear PCA feature spaces as they rotate, and used SVMs for multi-view face detection and pose estimation.

Schneiderman and Kanade [6] used multi-resolution information in different levels of wavelet transform, wherein a system consists of an array of two face detectors in a view-based framework. Here, each detector is constructed using statistics of products of histograms computed from examples of the respective view. Until now, this system appears to have achieved the best detection accuracy; however, it is often very slow due to computation complexity.

To address the problem of slow detection speed, Li, et al. [14] proposed a coarse-to-fine, simple-to-complex pyramid structure, by combining the idea of a boosting cascade [11] and view-based methods. Although, this approach improves the detection speed significantly, it still exhibits several problems. For example, as the system computation cost is determined by the complexity and false alarm rates of classifiers in the earlier stage, the inefficiency of AdaBoost significantly degrades the overall performance. As each boosting classifier works separately, the useful information between adjacent layers is discarded. This hampers the convergence of the training procedure. Furthermore, during the training process, more and more non-face samples collected by bootstrap procedures are introduced into the training set, which tends to (albeit gradually) increase the complexity of the classification. Indeed, the last stage pattern distribution between face and non-face can become so complicated that the patterns may not even be distinguished by Haar-like features. Additionally, view-based methods tend to suffer from the problems of high computation complexity and low detection precision.

In this description and the accompanying drawings, methods, apparatuses and systems are provided that employ a novel approach to rapid face detection. For example, certain implantations employ a three-step/stage algorithm based on a simple-to-complex processing strategy as mentioned earlier. In a first step/stage, a linear pre-filter is used to overcome the inefficiency of boosting algorithm. In the second step/stage, with the information between adjacent cascade layers, a boosting chain structure with a linear SVM optimizer is used to improve convergence speed of the learning process. In the third step/stage, as most non-faces in the candidate list are discarded, image pre-processing methods such as, lighting correction, histogram equalization are employed to alleviate face pattern variance, followed by a learning-based color-filter and/or SVM-filter to further reduce remaining false alarms.

In accordance with certain further aspects of the present invention, to enable the application of face detection in real life surveillance and biometric applications, for example, a multi-view face detection system is designed based on these novel approaches.

In certain implementations, the multi-view face detection system is able to handle pose variance in a wide range (e.g., −45°, 45°, both out-of-plane and in-plane rotation, respectively).

Certain exemplary multi-view face detection systems include a two-level hierarchy in-plane pose estimator based on Haar-like features. Here, for example, the pose estimator is configured to alleviate the variance of in-plane rotation by dividing the input portion into three channels, and an upright face detector based on a multiple-step/stage algorithm (e.g., a three-step algorithm) that enables the rapid multi-view face detection in a single classifier.

Exemplary Multiple-Step/Stage Face Detector

Figure 3:
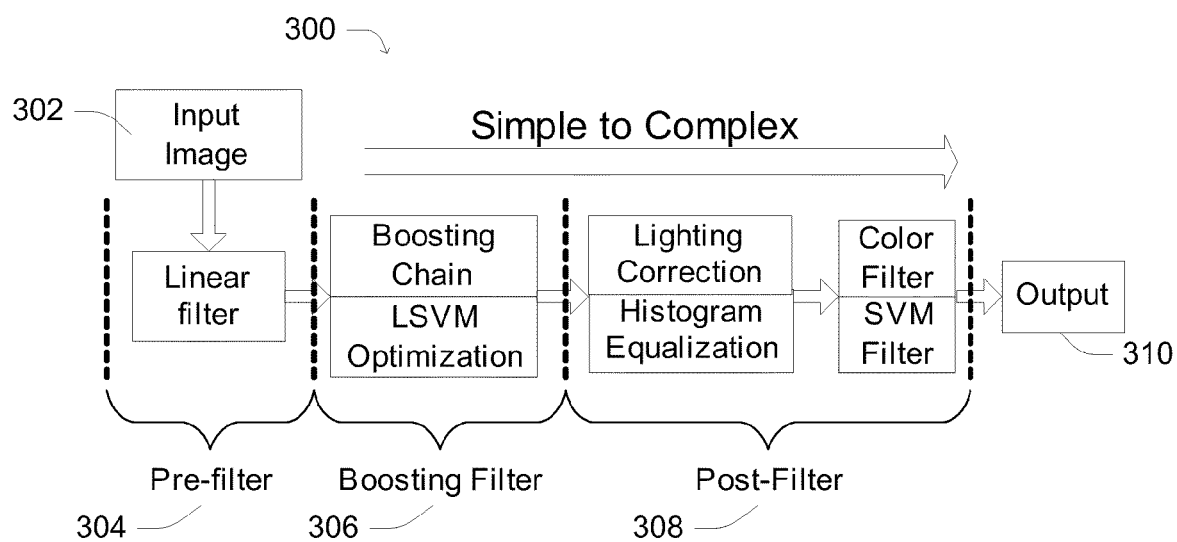
FIG. 3 is a block diagram depicting an exemplary multiple step face detector, in accordance with certain implementations of the present invention.

Attention is now drawn to FIG. 3., which is a block diagram illustrating an exemplary multiple-step/stage face detector 300 in accordance with certain implementations of the present invention.

Multiple-step/stage face detector 300 is implementable, for example, in logic 202 (FIG. 2). In this example, multiple-step/stage face detector 300 has three-steps/stages, however, one skilled in the art will recognize that fewer, more and/or different steps/stages may also be used. Note that, as used herein, the terms "step" and "stage" are used interchangeably and are intended to represent one or more processing capabilities.

Multiple-step/stage face detector 300 includes a linear pre-filter stage 304 that is configured to receive or otherwise access input image 302 and increase detection speed. The output from linear pre-filter stage 304 is then processed in a boosting filter stage 306. In this example, boosting filter stage 306 includes a boosting chain and Linear Support Vector Machine (LSVM) optimization processes. The boosting chain may, for example, include and/or be developed from Viola's boosting cascade [11]. The boosting chain is configured to remove most non-face portions from a plurality of candidate portions. LSVM is configured to further optimize the boosting classifier. In certain experimental implementations, it was found that as a result of boosting filter stage 306, the remaining candidate portions will be less than about 0.001% in all scale. The output from boosting filter 306 is then processed by a post-filter stage 308. Here, for example, post-filter stage 308 may include lighting correction, histogram equalization, color filter, and Support Vector Machine (SVM) filter capabilities. The lighting correction capability is configured to reduce the illumination/lighting variation. The histogram equalization capability is configured to reduce the contrast variation. The color filter capability is configured to remove non-face patterns based on the skin-tone color. The SVM filter capability is configured to remove non-face patterns based on the appearance of the input images. In this manner, for example, post-filter stage 308 is configured to further reduce false alarms and provide output 310.

Each of the exemplary stages/capabilities is described in greater detail below.

Detection with Boosting Cascade

To implement rapid face detection, a feature based algorithm is adopted in pre-filter stage 304 and boosting filter stage 306. Before continuing with this description, a few basic concepts are introduced.

Figure 4:
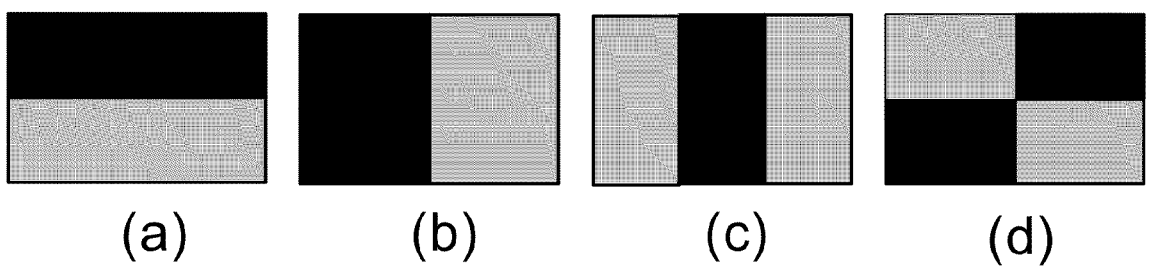
FIG. 4 is an illustrative diagram showing Haar-like features, in accordance with certain implementations of the present invention.

Haar-like feature: Four types of Haar-like features are depicted in FIGS. 4(a-d). These features are computed by mean value differences between pixels in the black rectangles and pixels in the grey rectangles, and both are sensitive to horizontal and vertical variations, which are critical to capture upright frontal face appearance.

Weak Learner: A simple decision stump $h_t(x)$ can be built on a histogram of the Haar-like feature $f_t$ on a training set, where $h_t(x)=\text{sign}(p_t f_t(x)-\theta_t)$, and $\theta_t$ is the threshold for the decision stump, and $p_t$ is the parity to indicate the direction of decision stump.

Integral Image: To accelerate the computation of the Haar-like feature, an intermediate representation of the input image is defined (e.g., as in Viola [11]). The value of each point (s,t) in an integral image is defines as:

$$ii(s, t) = \sum_{s' \le s, t' \le t} i(s', t') \qquad (1)$$

where i(s',t') is a grayscale value of the original image data. Based on this definition, the mean of the pixels within rectangle in the original image could be computed within three sum operations (see, e.g., Viola [11]).

Boosting Cascade: By combining boosting classifiers in a cascade structure, the detector is able to rapidly discard most non-face like portions. Those portions not rejected by the initial classifier are processed by a sequence of classifiers, each being slightly more complex than the previous. In certain experiments, for example, input image 30 included 640 pixel by 480 pixel images, containing more than one million face candidate portions in an image pyramid. With this structure, faces were detected using an average of 270 microprocessor instructions per portion, which represents significantly rapid detection.

Linear Pre-Filter Stage

Adaboost, developed by Freund and Schapire [18], has been proved to be a powerful learning method for the face detection problem. Given $(x_1,y_1), \ldots, (x_n,y_n)$ as the training set, where $y_i \in \{-1,+1\}$ is the class label associated with example $x_i$, the decision function used by Viola [11] is:

$$H(x) = \text{sign}\left(\sum_{t=1}^{T} a_t h_t(x) + b\right). \quad (2)$$

In Equation (2), $a_t$ is a coefficient, b is a threshold, $h_t(x)$ is a one-dimension weak learner defined in the previous section.

Figure 5:
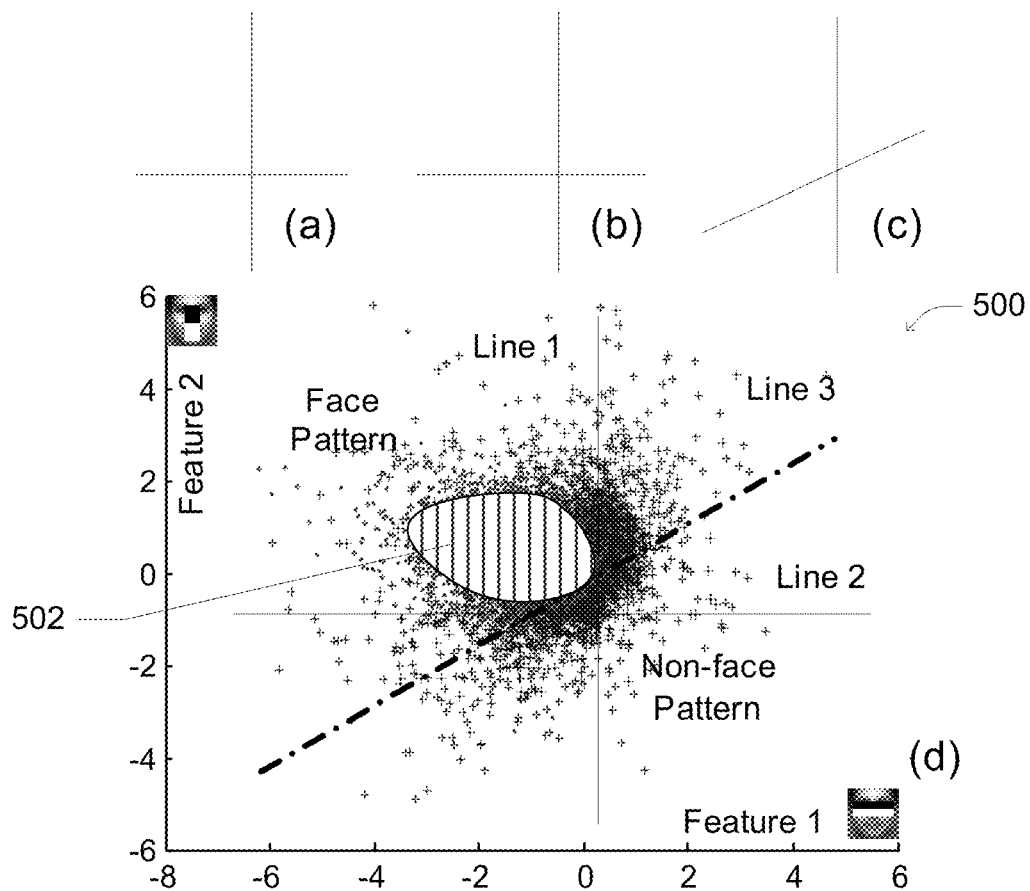
FIGS. 5(a-d) are graphs illustrating certain differences between an exemplary boosting classifier and a linear pre-filter, in accordance with certain implementations of the present invention.

In the case of T=2, the decision boundary of (2) could be displayed in the two dimensional space, as shown in demonstrative histograms in FIG. 5(a) and FIG. 5(b). Here, the line-shaded region represents potential face patterns. As only the sign information of $h_t(x)$ is used in (2), the discrimination capability of the decision function is greatly affected.

To address this problem, the decision function can be rewritten as follows:

$$H(x) = (a_1 f_1(x) > b_1) \land (a_2(f_1(x)) + r f_2(x)) > b_2), \quad (3)$$

where $a_i$, $b_i$ and $r \in (-1,1)$ are the coefficients that can be determined during a learning procedure, for example. Thus, a final decision boundary is shown in the demonstrative histogram FIG. 5(c). Here, the line-shaded region represents potential face patterns.

The first term in Equation (3) is a simple decision stump function, which can be learned, for example, by adjusting a threshold according to the face/non-face histograms of this feature. The parameters in the second term can be acquired, for example, by LSVM. Also, the target recall can be achieved by adjusting bias terms $b_i$ in both terms.

FIG. 5(d) includes a histogram 500 showing exemplary results of a comparison between linear filter stage 304 and a conventional boosting approach. The horizontal axis in associated with a first exemplary feature and the vertical axis is associated with a second exemplary feature. Face pattern areas and non-face pattern areas within histogram 500 are identified, as are a "Line 1" that runs vertically, a "Line 2" that runs horizontally, and a "Line 3" that slope upward/diagonally. Histogram 500 includes plotted data associated with the conventional boosting approach that is illustrated by the larger black crosses/regions and also includes at least some additional data that would be plotted within histogram area 502. Histogram 500 also includes plotted data associated with linear filter stage 304 that is illustrated by the smaller black crosses/regions and also includes substantial additional data that would be plotted within histogram area 502.

Note that in the actual plotted histogram from the experiment, two different colors were graphically used to plot the different data with the linear filter stage 304 data being plotted in a layer over the plotted data for the conventional boosting approach. In histogram 500 and for the purpose of this document, the area with the highest concentration of linear filter stage 304 data is essentially drawn over and covered by histogram area 502.

With this in mind, the difference in the plotted data in histogram 500 illustrates that, in this example, linear filter stage 304 effectively reduces the false alarm rate by about 25% or more. Furthermore, it was found that linear filter stage 304 is 19 able to maintain the substantially the same recall rate.

Boosting Filter Stage

A boosting cascade proposed by Viola [11], for example, has been proven to be an effective way to detect faces with high speed. During the training procedure, portions that are falsely detected as faces by the initial classifier are processed by successive classifiers. This structure dramatically increases the speed of the detector by focusing attention on promising regions of the image.

There is a need, however, to determine how to utilize historical knowledge in a previous layer and how to improve the efficiency of threshold adjusting. In accordance with certain implementations, these needs and/or others are met by boosting filter stage 306, which includes a boosting chain with LSVM or other like optimization.

Boosting Chain:

In each layer of the boosting cascade proposed by Viola in [11], the classifier is adjusted to a very high recall ratio to preserve the overall recall ratio. For example, for a twenty-layer cascade, to anticipate a overall detection rates at 96% in the training set, the recall rate in each single layer needs to be 99.8%

$$\left(\sqrt[20]{0.96} = 0.998\right)$$

on the average. However, such a high recall rate at each layer is achieved with the penalty of sharp precision decreasing.

Figure 7:
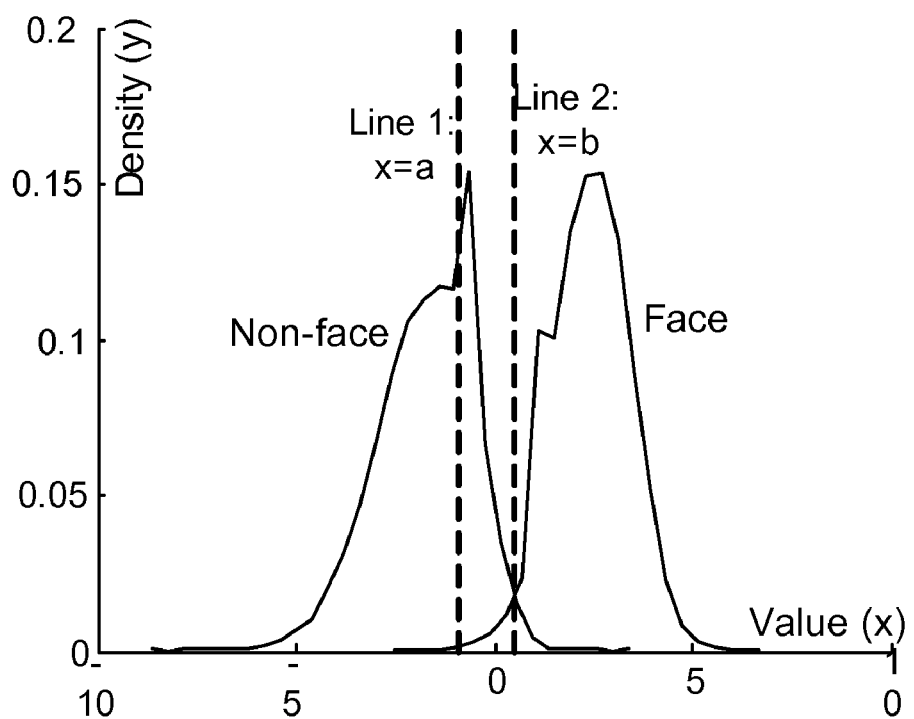
FIG. 7 is a graph illustrating an exemplary technique for adjusting the threshold for a layer classifier, in accordance with certain implementations of the present invention.

Attention is drawn to the graph in FIG. 7 that illustrates an exemplary technique for adjusting the threshold for a layer classifier. As shown in FIG. 7, value b is computed for the best precision, and value a is the "best threshold" that satisfies a desired (minimal) recall. During the threshold adjustment from value b to value a, the classifier's discrimination capability in the range $[a, +\infty]$ is lost. As the performance of most weak learners used in the boosting algorithm is near to a random guess, such discriminative information discarded between the layers of boost cascade can be critical to increase the convergence speed of successive classifiers.

Figure 6:
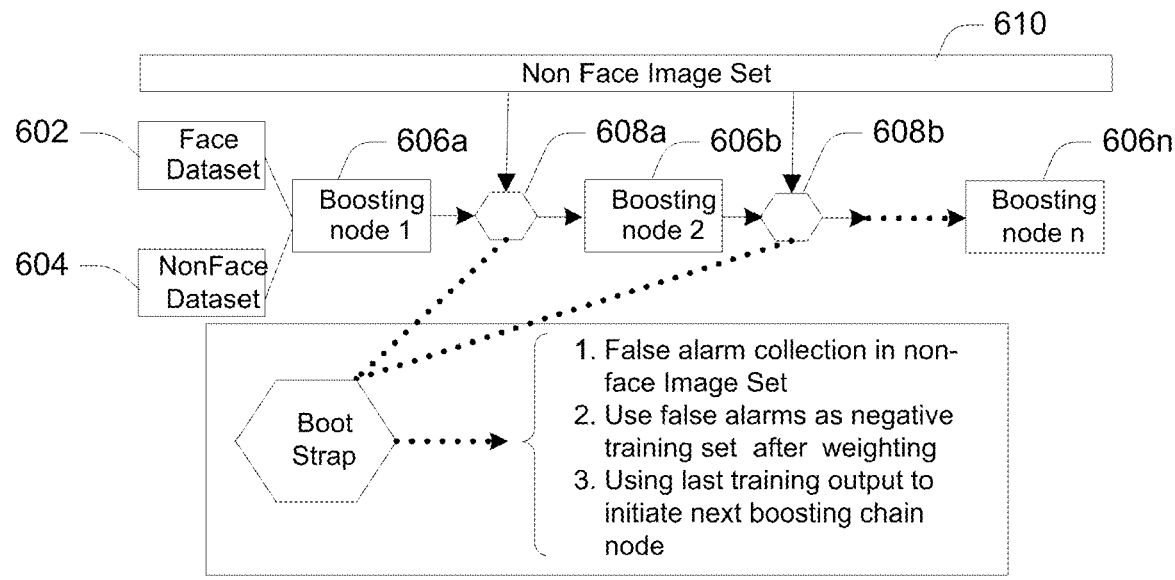
FIG. 6 is a block diagram depicting an exemplary boosting chain structure, in accordance with certain implementations of the present invention.

To address this issue, a boosting chain structure may be employed, in accordance with certain aspects of the present invention. An exemplary boosting chain structure 600 is depicted in block diagram form in FIG. 6. Here, for example, a face dataset 602 and non-face dataset 604 are provided to a first boosting node 606a. The output from boosting node 606a is provided to a boot strap function 608a along with non-face image set 610. The output from boot strap function 608a is provided to the next boosting node 606b. The output from boosting node 606b is then provided to a boot strap function 608b along with non-face image set 610. This chain structure continues through to the $n^{th}$ boosting node (606n), etc.

With this exemplary structure, the implemented algorithm can be:

Assume: $\Phi_i$=boosting classifier for node i in the boosting chain,
P=positive training set, p|P|
$N_i$=ith negative training set, $n_i = |N_i|$
$f_i$=maximum acceptable false positive rate of ith layer,
$d_i$=minimum acceptable detection rate of ith layer,
$w_j$=weighting of sample $x_j$
$F_{target}$=target overall false positive rate.
Initialize: i=0, $F_0$=1, $\Phi$={ }.
$w_j$=1/p for all positive sample $x_j$, $w_j$=1/$n_i$ for all negative sample $x_j$;
While $F_i > F_{target}$
i=i+1
Train a boosting classifier $\Phi_i$ with threshold $b_i$ for node i:
Using P and $N_i$ as training set, $w_j$ as the initial weights,
Using boosting chain $\Phi$ as the first weak learner,
Adjust $\Phi_i$ to meet the requirement of $f_i$ and $d_i$ on validation set.

$F_i = F_{-1} * f_i$, $\Phi = \cup \{\Phi_i\}$

Evaluate the boosting chain $\Phi$ on non-face image set, and put false detections into the set $N_{i+1}$ For each sample $x_j$ in set $N_{i+1}$ Update its weight $w_j$ in boosting chain $\Phi$, with the same strategy as AdaBoost used.

Boosting chain structure 600 can be evaluated, for example, using a process as follows:

Given an example x, evaluate the boosting chain with T node

Initialize s=0

Repeat for t=1 to T:

s=s+$\Phi_t$(x)

if (f<$b_t$) then classify x as non-face and exit

Classify x as face.

Boosting chain structure 600 can be trained in a serial of boosting classifiers, with each classifier corresponding to a node of the chain structure. This is different than a typical boosting cascade algorithm. For example, in boosting chain structure 600 positive sample weights are directly introduced into the substantial learning procedure. For negative samples, collected by the implemented bootstrap technique, their weights can be adjusted according to the classification errors of each previous weak classifier. Similar to the equation used in boosting training procedure [12], the adjusting could be done by:

$$w_j \leftarrow c \exp\left[-y_j \sum_{t=1}^{i} \Phi_t(x_j)\right], \quad (4)$$

where $y_j$ is the label of sample $x_j$, c is the initial weight for negative samples, and i is the current node index.

The result from a previous node classifier is not discarded while training the sub-sequential new classifier. Instead, the previous classifier is regarded as the first weak learner of the current boosting classifier. Therefore, the boosting classifiers are essentially linked into a "chain" structure with multiple exits for negative patterns. The evaluation of the boosting chain may be done, for example, as described in the sections below.

Linear Optimization:

In each point/act of boosting chain structure 600, performance for the current stage can be considered to involve a tradeoff between accuracy and speed. Here, for example, the more features that are used, higher the likely detection accuracy will be. At the same time, classifiers with more features require more (processing) time to evaluate. The relatively naïve optimization method used by Viola is to simply adjust the threshold for each classifier to achieve the balance between the targeted recall and false positive rates. However, as mentioned above, this frequently results in a sharp increase in false rates. To address this problem, a new algorithm based on linear SVM is provided for post-optimization, in accordance with certain further aspects of the present invention.

Alternatively, the final decision function of AdaBoost in Equation (2) could be regarded as the linear combination of weak learners $\{h_1(x), h_2(x), \ldots, h_T(x)\}$.

Each weak learner $h_t(x)$ can be determined after the boosting training. When it is fixed, the weak learner maps the sample $x_i$ from the original feature space F to a point $$x_i^* = h(x_i) = \{h_1(x_i), h_2(x_i), \ldots, h_T(x_i)\} \quad (5)$$

In a new space F* with new dimensionality T. Consequently, the optimization of the $a_t$ parameter can be regarded as finding an optimal or substantially optimal separating hyperplane in the new space F*. The optimization may be obtained by the linear SVM algorithm, for example, and resolving the following quadratic programming problem:

Maximize:

$$L(\beta) = \sum_{i=1}^{n} \beta_i - \frac{1}{2} \sum_{i,j=1}^{n} \beta_i \beta_j y_i y_j (h(x_i) \cdot h(x_j)) \quad (6)$$

subject to the constraints $$\sum_{i}^{n} \beta_i y_i = 0 \text{ and } C_i \geq \beta_i \geq 0, i = 1, \ldots, n.$$

Here, coefficient $C_i$ can be set according to a classification risk w and trade-off constant c over the training set:

$$C_i = \begin{cases} wC & \text{if } x_i \text{ is a face pattern} \\ C & \text{otherwise} \end{cases} \quad (7)$$

The solution of this maximization problem may be denoted by $\beta^0 = (\beta_1^0, \beta_2^0, \ldots, \beta_n^0)$. The optimized a, will then be given by $$a_t = \sum_{i=1}^{n} \beta_i y_i h_t(x_i).$$

By adjusting the bias term b and classification risk w, the optimized or substantially optimized result may be determined.

Figure 8:
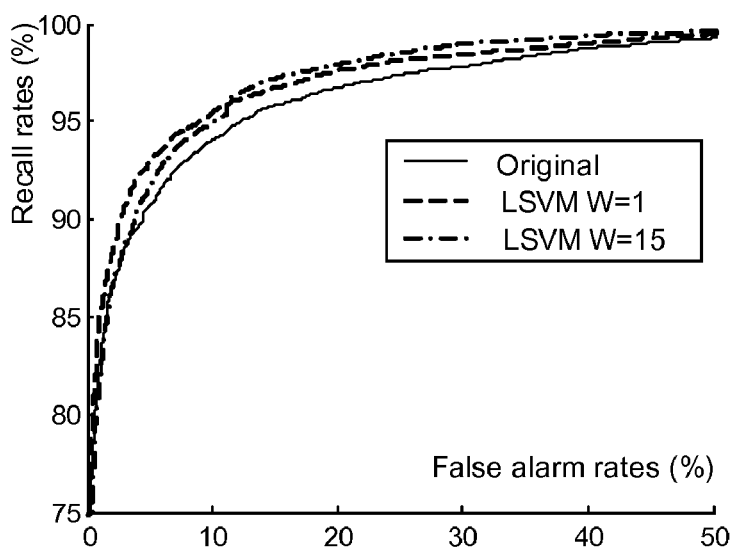
FIG. 8 is a graph showing ROC curves of associated with a boosting chain algorithm and an LSVM optimization algorithm with different weights, in accordance with certain exemplary implementations of the present invention.

The efficiency of this novel algorithm are illustrated in the line graph in FIG. 8, which shows the false alarm rate percentage versus the recall rate percentage for an (original) boosting chain algorithm without LSVM optimization, a boosting chain algorithm with LSVM and w of 1, and a boosting chain algorithm with LSVM and w of 15. As depicted, the recall rate percentages were significantly higher for the boosting chain algorithm with LSVM and w=1 and the boosting chain algorithm with LSVM and w=15 when compared to the boosting chain algorithm without LSVM optimization for the shown false alarm rate percentages.

Post-Filter Stage

Following boosting filter stage 306 there may still remain many false alarms due, for example, to variations of image patterns and/or limitations of the Haar-like features. To reduce the number of false alarms remaining, post-filter stage 308 is introduced. In an exemplary post-filter stage 308, a set of image pre-processing procedures are applied to the remaining candidate portions of the image that reduce pattern variations, then two filters based on color information and wavelet features are applied to further reduce false alarms.

Image Pre-Processing:

The image pre-processing procedure is configured to alleviate background, lighting and/or contrast variations. An exemplary image pre-processing procedure may include several steps. By way of example, techniques in Rowley et al. [7] can be applied to perform a three step image pre-processing procedure. For example, in a first step, a mask is generated by cropping out the four edge corners of the portion shape and this mask applied to candidate portions. In the second step a linear function is selected to estimate the intensity distribution on the current portion. By subtracting the plane generated by this linear function, lighting variations can be significantly reduced. In the third step, histogram equalization is performed. As a result of this non-linear mapping, the range of pixel intensities is enlarged. This enlargement tends to improve the contrast variance caused, for example, by camera input differences.

Color-Filter:

Modeling of skin-tone color has been studied extensively in recent years, see e.g., Hsu et al. [13].

In certain exemplary implementations of multiple-step/stage face detector 300, $YC_bC_r$ space is adopted due to its perceptually uniformity. Here, the luminance Y component mainly represents image grayscale information which tends to be far less relevant to skin-tone color than the chrominance $C_b$ and $C_r$ components. As such, the $C_b$ and $C_r$ components can be used for false alarm removal.

Figure 9:
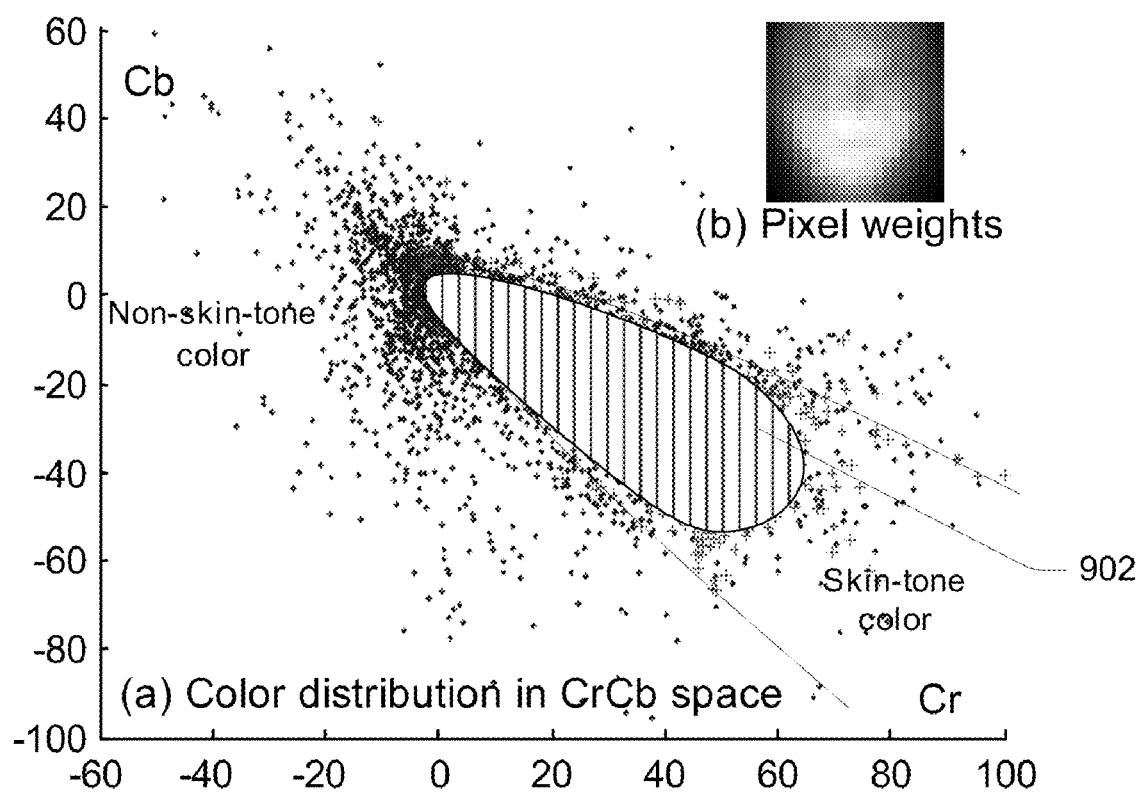
FIGS. 9(a-b) include a graph and image illustrating color distribution using a two-degree polynomial color filter, in accordance with certain exemplary implementations of the present invention.

Attention is now drawn to FIGS. 9(a-b). FIG. 9(a) is graph showing the color of face and non-face images distributed as nearly Gaussian in $C_bC_r$ space. Here, the smaller black crosses and black area show plotted non-skin tone color data, and line-shaded graph area 902 and the larger black crosses show plotted skin tone color data.

A two-degree polynomial function can be used as an effective decision function. For any point $(c_b,c_r)$ in the $C_bC_r$ space, the decision function can be written as:

$$F(c_r, c_b) = \text{sign}(a_1 c_r^2 + a_2 c_r c_b + a_3 c_b^2 + a_4 c_r + a_5 c_b + a_6) \tag{8}$$

which is a linear function in the feature space with dimension $(c_r^2, c_r, c_b^2, c_r, c_b)$. Consequently, a linear SVM classifier can be constructed in this five dimension space to separate skin-tone color from the non-skin-tone color.

Thus, for example, for each face training sample, a classifier $F(c_r, c_b)$ is applied to each pixel of face image. FIG. 9(b) shows pixel weights of a face image. Statistical results can be therefore be collected as in FIG. 9(b), the grayscale value of each pixels corresponding to its ratio to be skin-tone color in the training set. Therefore, the darker the pixel is, the less likely it is that it will be a skin-tone color. In this example, only 50% of the pixels with large grayscale values were included to generate the mean value for color-filtering. In an experiment using 6423 face and 5601 non-face images samples, a recall rate of 99.5% was achieved and more than one third of the remaining false alarms removed.

SVM-Filter:

SVM is well known and is basically a technique for learning from examples. SVM is founded in statistical learning theory. Due to SVM's high generalization capability it has been widely used for object detection since 1997, see, e.g., Osuna et al. [4].

However, kernel evaluation using an SVM classifier tends to be significantly (processing) time consuming and can lead to slow detection speeds. Serra et al. [16] proposed a new feature reduction algorithm to solve these drawbacks. This work inspired a new way to reduce kernel size. For any input imageu, v a two-degree polynomial kernel is defined as:

$$k(u,v)=(s(u \cdot v)+b)^2 \tag{9}$$

Serra et al. extended it into a feature space with dimension p=m*(m+3)/2, where m is the dimensionality of sample u. For example, a sample with dimensionality 400 will be mapped into the feature space with dimensionality 80600. In this space, the SVM kernel can be removed by computing the linear decision function directly. With a simple weighting schema, Serra et al. reduced 40% of the features without significant loss of classification performance.

In accordance with certain further aspects of the present invention, based on wavelet analysis of the input image, a new approach provides for more feature reduction without loosing classification accuracy. As is well known, wavelet transformation may be regarded as a complete image decomposition method that has little correlation between each of the resulting sub-bands.

Figure 10:
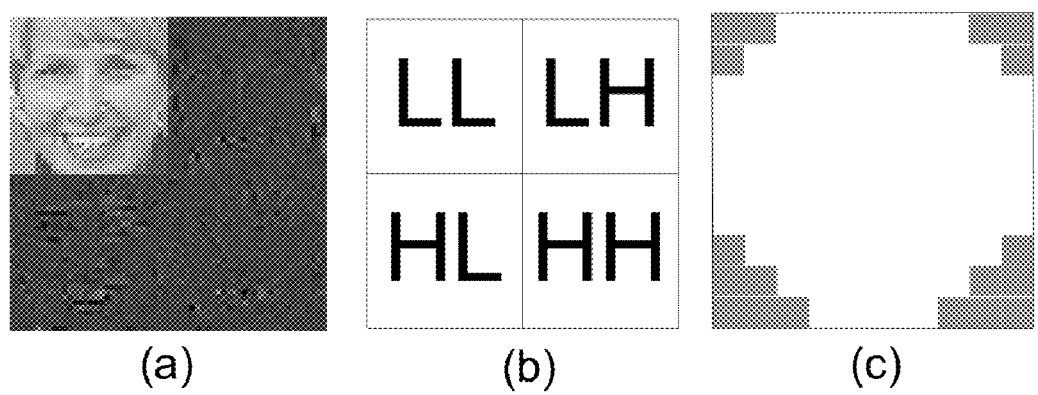
FIGS. 10(a-c) illustrate wavelet extraction, wavelet transformation, and mask cropping associated with an image, in accordance with certain exemplary implementations of the present invention.

With this in mind, attention is drawn to FIG. 10(a, b, c) which illustrate wavelet extraction, wavelet transformation, and mask cropping associated with an image, in accordance with certain exemplary implementations of the present invention. Here, the SVM filter in post-filter 308 can be configured to reduce redundancy in the feature space by implementing an algorithm that works as follows. First, wavelet transformation is performed on the input image. As represented by FIG. 10(a, b), the original image of size 20×20 is divided into four sub-bands with size of 10*10. Then a new kind of second-degree polynomial SVM kernel, as shown in the following equation is used to reduce the redundancy of the feature space, $$k'(u, v) = \sum_{0 \leq i < 4} (s_i u_i^T v_i + r_i)^2 \tag{10}$$

where each vector $u_i$ and $v_i$ corresponds to a sub-band of transformed image. Thus, for a 20×20 image, the dimensionality of vector $u_i$ ($v_i$) is 100.

It is noted that the image shown in FIG. 10(a) associated with the LH, HL, and HH sub-bands in this printed document appears to be all black, however information does exist for these areas too, but it is not as visually obvious in the drawing.

As shown in FIG. 10(c), the dimensionality in this example can be further reduced to 82 by cropping out the four corners of each sub-band portion, which mainly consists of image background. Consequently, the dimensionality of the feature space of kernel k'(u,v) is p*=4*82*(82+3)/2=13940.

This results in a more compact feature space with much smaller (about 29%) features than Serra et al's approach, while similar classification accuracy is achieved in this space.

Exemplary Robust Multi-View Face Detection Systems

In surveillance and biometric applications, human faces that appear in images can do so with a range of pose variances. In this section, the pose variance is considered in a range of out-of-plane rotation $\Theta=[-45,45]$ and in-plane rotation $\Phi=[-45°, 45°]$. This is by way of an example only, as other implementations can have different ranges (greater or smaller).

Haar-like features, e.g., as shown in FIGS. 4(a-d), are sensitive to horizontal and vertical variations. As such, for example, in-plane rotation can be extremely difficult for conventional boosting approaches to handle.

In accordance with certain aspects of the present invention, this problem is addressed by first applying an in-plane orientation detector to determine the in-plane orientation of a face in an image with respect to an up-right position; then, an up-right face detector that is capable of handling out-plane rotation variations in the range of $\Theta[-45°, 45°]$ is applied to the candidate portion with the orientation detected before. Some exemplary apparatuses, namely an in-plane estimator and an upright multi-view face detector, are described below for use in this manner.

In-Plane Rotation Estimator:

In the past, the problem of in-plane rotation variations has been addressed by training a pose estimator to rotate the portion to an upright position. See, for example, Rowley et al. [7]. Such methods, however, typically result in slow processing speed due to the high computation costs for pose correction of each candidate portion.

In accordance with certain aspects of the present invention, a novel approach is provided which includes, for example, the following steps. Firstly, h is divided into three sub-ranges, e.g., $\Phi_{-1}=[-45°, -15°]$, $\Phi_0=[-15°, 15°]$ and $\Phi_1=[15°, 45°]$. Next, the input image is in-plane rotated by a specified amount, e.g., ±30°. As such, there are three resulting images including the original image, each corresponding to one of the three sub-ranges respectively. Next, an estimation of in-plane orientation is made for each portion based on the original image. Thereafter, based on the in-plane orientation estimations, the upright multi-view detector is applied to the estimated sub-range at the corresponding location.

Figure 11:
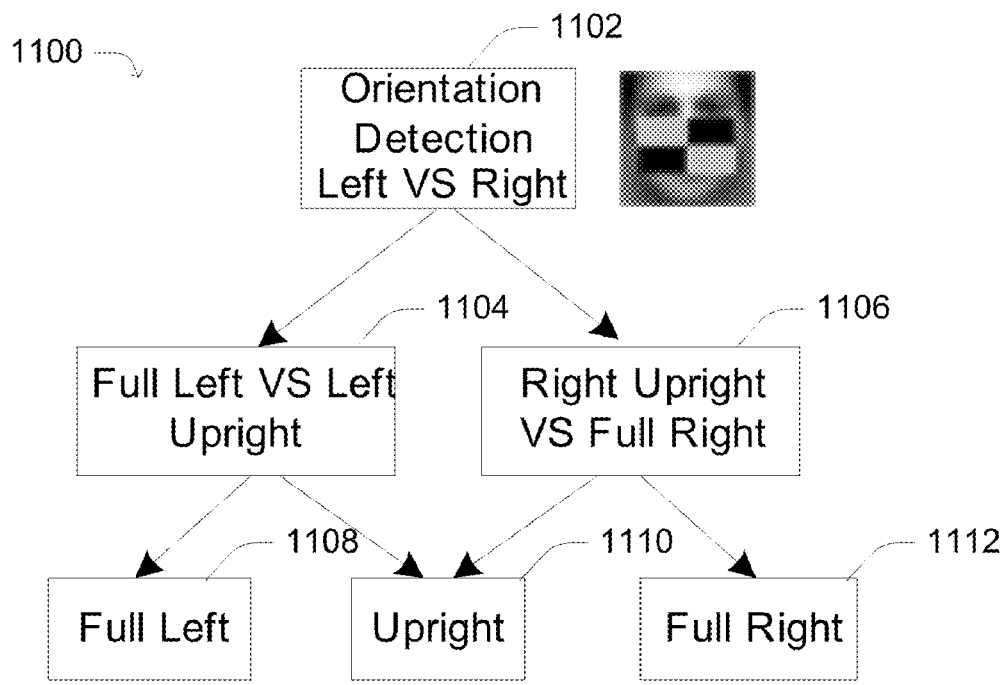
FIG. 11 is a flow diagram depicting an exemplary technique for in-plane estimation based on Haar-like features, in accordance with certain implementations of the present invention.

Attention, for example, is drawn to the flow diagram in FIG. 11 which depicts an exemplary method 1100 for in-plane estimation based on Haar-like features, in accordance with certain implementations of the present invention.

As shown in FIG. 11, the design of the pose estimator adopts a coarse-to-fine strategy, for example, see Fleuret et al. [5]. In this example, in act 1102 the full range of in-plane rotation is first divided into two channels (left, right), e.g., covering ranges of [−45°, 0°] and [0°, 45°]. In act 1102, for example, as shown in the face image only one Haar-like feature is used. In act 1104 full left versus left upright provides finer estimation. In act 1106 right upright versus full left provides finer estimation. This leads to acts 1008 (full left), 1110 (upright) and 1112 (full right), wherein a final estimation is made. Here, for example, the finer prediction can be based on an AdaBoost classifier with six Haar-like features performed in each channel to obtain the final prediction of the sub-range.

Upright Multi-View Face Detector:

The use of in-plane pose prediction reduces the face pose variation in the range of out-of-plane rotation Θ and in-plane rotation $\Phi_0$. With such variance, it is possible to detect upright faces in a single detector based on the three-step algorithm presented herein, for example.

The exemplary system tends to increase detection speed and reduce the false alarm rate. It has been found that in certain implementations, the exemplary boosting training procedure described in the Boosting Chain Section above may converge too slowly and/or may be easy to over-fit. This reveals the limitation of conventional Haar-like features in characterizing multi-view faces.

Figure 12:
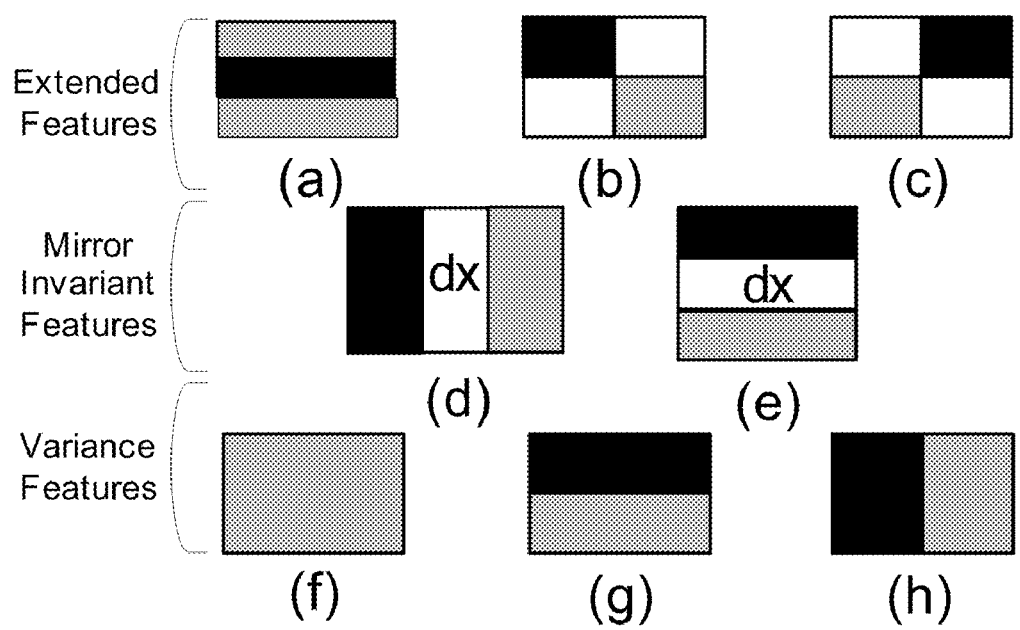
FIGS. 12(a-h) illustrate extended features, mirror invariant features, and variance features that may be used in face detection systems, in accordance with certain exemplary implementations of the present invention.

To address such issues, in accordance with certain further aspects of the present invention, three sets of new features are presented based on an integral image. FIGS. 12(a-h) show eight features divided into three sets. These features enhance the discrimination ability of the basic Haar-like features in FIGS. 4(a-d).

The first set includes extended features in FIG. 12(a, b, and c). The extended feature in FIG. 12(a) enhances the ability to characterize vertical variations. Similarly, the extended features in FIG. 12(b) and FIG. 12(c) are each cable of capturing diagonal variations.

The second set includes mirror invariant features of FIG. 12(d) and FIG. 12(e). These mirror invariant features are more general and do not require that the rectangles in the features be adjacent. Here, if these features overwhelm the feature set with their extra degree of freedom dx, then an extra constraint of the mirror invariant may be added to reduce the size of feature set while the most informative features are preserved.

The third set includes three variance features shown in FIG. 12(f), FIG. 12(g) and FIG. 12(h). These variance features are configured to capture texture information of facial patterns and are different from the previous features. In these variance features variance values instead of mean values of pixels in the feature rectangles are computed. For example, feature g contains two rectangles laid vertically, and the value of feature g is computed from the variance difference between the upper and lower rectangles. The resulting additional statistical information is then used to further help distinguish face patterns from non-face patterns.

The introduction of the new features in FIGS. 12(a-g) greatly increases the convergence speed of the training process. Indeed, experimental results show that nearly 69% of the features selected by boosting are new features, in which more than 40% of the features are variance features.

CONCLUSION

Although the invention has been described in language specific to structural features and/or methodological acts, it is to be understood that the invention defined in the appended claims is not necessarily limited to the specific features or steps described.

What is claimed is:

1. A method for use in detecting faces within a digital image, the method comprising:

processing via a processor, in a pre-filter stage, a set of digital image data to produce a set of initial candidate portions using at least one feature algorithm, the pre-filter stage including a linear filter based on a decision function having coefficients that are determined during a learning procedure;

processing via the processor, in a boosting filter stage, the set of initial candidate portions to produce a set of intermediate candidate portions, the boosting filter stage including:

a boosting chain having a plurality of boosting chain nodes to identify candidate portions and a boot strap function following each of the plurality of boosting chain nodes, the boot strap function to use a weak learner of a previous boosting chain node in training another boosting chain node of the boosting chain, wherein the weak learner includes building a simple decision stump on a histogram of a Haar-like feature on a training set; and processing via the processor, the set of intermediate candidate portions in a post-filter stage to produce a set of final candidate portions, wherein the post-filter stage includes an image pre-processing process, a color-filter process, and a support vector machine (SVM) filter process.

2. The method as recited in claim 1, further comprising dividing a digital image into a plurality of portions.

3. The method recited in claim 2, wherein at least one of the plurality of portions has a shape selected from a group of shapes comprising, mangle and a square.

4. The method as recited in claim 2, further comprising processing the plurality of portions in the pre-filter stage, wherein the set of initial candidate portions are selected from the plurality of portions passed on at least one feature.

5. The method as recited in claim 4, wherein the feature includes at least one feature selected from a group of features comprising a Haar-like feature, extended feature, a mirror invariant feature, and a variance feature.

6. The method as recited in claim 4, wherein the pre-filter stage includes the linear filter.

7. The method recited in claim 6, wherein the linear filter is based on the weak learner.

8. The method as recited in claim 6, wherein the linear filter is based on a decision function of $H(x)=(a_1f_1(x)>b_1)\hat{}(a_2(f_1(x)+rf_2(x))>b_2)$, wherein $a_i$, $b_i$ where i=1,2 and r∈(−1,1) are coefficients determined during the learning procedure and $f_1$ and $f_2$ are features selected from a group of features.

9. The method as recited in claim 1, further comprising training the boosting chain using face images, non-face images, and weak classifiers.

10. The method as recited in claim 9, wherein the boosting chain includes the plurality of boosting nodes arranged in an order within the boosting chain.

11. The method as recited in claim 10, wherein the boosting chain is trained using boosting classifiers corresponding to the boosting nodes.

12. The method as recited in claim 10, wherein a sample weight initialized for a current boosting classifier is adjusted based on a classification error rate of a previous boosting node within the order.

13. The method as recited in claim 1, wherein the boosting chain includes a hierarchical chain structure.

14. The method as recited in claim 1, wherein the boosting filter stage includes a Linear Support Vector Machine (LSVM) optimization.

15. The method as recited in claim 14, wherein the LSVM optimization is capable of finding a global maximum.

16. The method as recited in claim 15, wherein finding the global maximum is based on:

Maximize:

$$L(\beta) = \sum_{i=1}^{n} \beta_i - \frac{1}{2}\sum_{i,j=1}^{n} \beta_i \beta_j y_i y_j (h(x_i) \cdot h(x_j))$$

subject to the constraints $$\sum_{i}^{n} \beta_i y_i = 0 \text{ and } C_i \geq \beta_i \geq 0, i = 1, \ldots, n.$$

, wherein β is a bias term, $y_i$ is a label of sample $x_i$, $y_j$ is a label of sample $x_j$, and $h(x_i)$ and $h(x_j)$ are the weak learner and wherein coefficient $C_i$ set according to a classification risk w and trade-off constant C over a training set $$C_i = \begin{cases} wC & \text{if } x_i \text{ is a face pattern} \\ C & \text{otherwise} \end{cases}.$$

17. The method as recited in claim 1, wherein the post-filter stage further includes a masking processing.

18. The method as recited in claim 1, wherein the image pre-processing process includes lighting correction processing.

19. The method as recited in claim 1, wherein the image pre-processing process includes histogram equalization processing.

20. The method as recited in claim 1, further comprising outputting information associated with the set of final candidate portions.

21. The method as recited in claim 20, wherein the information identifies at least said the set of final candidate portion.

22. The method as recited in claim 20, wherein the information includes at least said the set of final candidate portion.

23. The method as recited in claim 20, wherein the information identifies rotation data associated with at least the set of final candidate portions.

24. The method as recited in claim 1, wherein the at least one feature based algorithm uses Haar like features.

25. The method as recited in claim 24, wherein the at least one feature based algorithm uses extended features.

26. The method as recited in claim 24, wherein the at least one feature based algorithm uses mirror invariant features.

27. The method as recited in claim 26, wherein an extra constraint of the mirror invariant features is added to reduce a size of a feature set associated with the mirror invariant features.

28. The method as recited in claim 24, wherein the at least one feature based algorithm uses variance features.

29. The method as recited in claim 1, wherein the decision function is the simple decision stump function learned by adjusting a threshold according to face/non-face histograms.

30. The method as recited in claim 1, further comprising performing in-plane estimation to detect an orientation of a face image data wherein the face image data is part of the set of digital image data.

31. The method as recited in claim 30, wherein the orientation is with respect to an up-right position.

32. The method as recited in claim 30, further comprising performing up-right face detection based on the in-plane estimation.

33. The method as recited in claim 32, wherein the up-right face detection identifies out-plane rotation variations of the face image data.

34. The method as recited in claim 33, wherein the out-plane rotation variations are within a range of Θ=[45°,45°].

35. The method as recited in claim 1, wherein the SVM filter process is performed in a redundancy reduced feature space.

36. The method as recited in claim 35, wherein the SVM filter process further includes performing wavelet transformation to divide the set of digital image data into four sub-bands LL, HL, LH and HH.

37. The method as recited in claim 36, wherein the SVM filter process reduces a redundancy of feature spaces using a second degree polynomial SVM Kernel:

$$k'(u, v) = \sum_{0 \leq i < 4} (s_i u_i^T v_i + r_i)^2,$$

where s is a serial of boosting classifiers, the superscript T is a dimensionality, and r is a constant wherein each vector $u_i$ and $v_i$ corresponds to an $i^{th}$ sub-band portion.

38. The method as recited in claim 36, further comprising selectively cropping of four sub-band portions.

39. A computer-readable medium having computer-implementable instructions for causing at least one processing unit to perform acts comprising:

detecting possible human face image data within a digital image using a multiple stage face detection scheme that includes:

a boosting filter stage to process a set of initial candidate portions of digital image data to produce a set of intermediate candidate portions using a plurality of boosting chain nodes and a boot strap function following each of the plurality of boosting chain nodes, the boot strap function to adjust a sample weight initialized for a current boosting classifier of a current boosting chain node based on a classification error rate of a previous boosting node; and a post-filtering stage configured to process the set of intermediate candidate portions to produce a set of final candidate portions, wherein the post-filter stage includes an image pre-processing process, a color-filtering process, and a support vector machine (SVM) filtering process, the SVM filtering process to perform wavelet transformation on the set of intermediate candidate portions.

40. The computer-readable medium as recited in claim 39, further comprising dividing the digital image into a plurality of portions, and wherein at least one of the plurality of portions has a shape selected from a group of shapes comprising a rectangle and a square.

41. The computer-readable medium as recited in claim 40, wherein the multiple stage face detection scheme further includes a pre-filter stage that is configured to output the set of initial candidate portions selected from the plurality of portions based on at least one feature.

42. The computer-readable medium as recited in claim 41, wherein the feature includes at least one feature selected from a group of features comprising a Haar-like feature, an extended feature, a mirror invariant feature, and a variance feature.

43. The computer-readable medium as recited in claim 41, wherein the pre-filter stage includes a linear filter based on a weak learner.

44. The computer-readable medium as recited in claim 39, wherein a boosting chain is trained using face images, non-face images, and weak classifiers.

45. The computer-readable medium as recited in claim 39, wherein the boosting chain includes a hierarchical chain structure.

46. The computer-readable medium as recited in claim 44, wherein the boosting chain includes the plurality of boosting chain nodes arranged in an order within the boosting chain, the boosting chain is trained using boosting classifiers corresponding to the boosting chain nodes, and each of the boosting chain nodes is constructed based on its preceding node in the order.

47. The computer-readable medium as recited in claim 39, wherein the boosting filter stage includes a Linear Support Vector Machine (LSVM) optimization.

48. The computer-readable medium as recited in claim 39, wherein the post-filter stage further includes a masking process, a lighting correction process and a histogram equalization process.

49. The computer-readable medium as recited in claim 48, wherein the SVM filter process is configured to reduce redundancy in a feature space associated with at least one intermediate candidate portion, and performs wavelet transformation of the at least one intermediate candidate portion to produce a plurality of sub-bands portions.

50. The computer-readable medium as recited in claim 49, further comprising selectively cropping at least one of the plurality of sub-band portions.

51. The computer-readable medium as recited in claim 39, further comprising employing at least one feature-based algorithm that uses at least one feature selected from a group of features including at least one Haar-like feature, at least one extended feature, at least one mirror invariant feature, and at least one variance features.

52. The computer-readable medium as recited in claim 39, further comprising performing in-plane estimation to predict an orientation of the face image data and applying an up-right detector to pre-rotated image data corresponding to the orientation prediction.

53. An apparatus comprising:
one or more processors; and
memory having instructions including logic executable by the one or more processors to Perform a multiple stage face detection scheme to detect at least one human face within a digital image, the memory including:

a boosting filter stage configured to process a set of initial candidate portions of digital image data using a boosting chain to produce a set of intermediate candidate portions, wherein the boosting chain includes a plurality of boosting chain nodes to identify candidate portions and a boot strap function following each of the plurality of boosting chain nodes, the boot strap function to use a weak learner of a previous boosting chain node in training another boosting chain node of the boosting chain, wherein the weak learner includes building a simple decision stump on a histogram of a Haar-like feature on a training set; and a post-filter stage configured to process the set of intermediate candidate portions to produce a set of final candidate portions, wherein at least one of the final candidate portions includes detected face image data.

54. The apparatus as recited in claim 53, wherein the logic is further configured to divide the digital image into a plurality of portions, and wherein at least one of the plurality of portions has a shape selected from a group of shapes comprising a rectangle and a square.

55. The apparatus as recited in claim 54, wherein the multiple stage face detection scheme further includes a pre-filter stage wherein the logic is configured to output the set of initial candidate portions selected from the plurality of portions based on at least one feature.

56. The apparatus as recited in claim 55, wherein the feature includes at least one feature selected from a group of features comprising a Haar-like feature, an extended feature, a mirror invariant feature, and a variance feature.

57. The apparatus as recited in claim 55, wherein as part of the pre-filter stage the logic includes a linear filter based on the weak learner.

58. The apparatus as recited in claim 53, wherein the boosting chain is trained using face images, non-face images, and weak classifiers.

59. The apparatus as recited in claim 58, wherein to provide the boosting chain the logic includes the plurality of boosting chain nodes and a plurality of boot strap functions arranged in an alternating order within the boosting chain, and wherein the boosting chain is trained using boosting classifiers corresponding to the boosting chain nodes, and wherein at least one sample weight associated with one of the plurality of boot strap functions is adjusted based on at least one classification error of a weak classifier associated with a previous node.

60. The apparatus as recited in claim 53, wherein the boosting chain is operatively arranged in a hierarchical chain structure.

61. The apparatus as recited in claim 53, wherein the boosting filter stage includes a Linear Support Vector Machine (LSVM) optimization configured to determine a global maximum.

62. The apparatus as recited in claim 53, wherein as part of the post-filter stage the logic is further configured to perform at least one process selected from a group of processes that includes a lighting correction process, a histogram equalization process a color filter process, and an SVM filter process.

63. The apparatus as recited in claim 62, wherein as part of the SVM filter process the logic is configured to reduce redundancy in a feature space associated with at least one intermediate candidate portion based on wavelet transformation of the at least one intermediate candidate portion that produces a plurality of sub-bands portions.

64. The apparatus as recited in claim 53, wherein the logic is further configured to output information associated with the set of final candidate portions.

65. The apparatus as recited in claim 64, wherein the information includes rotation data associated with the set of final candidate portions.

66. The apparatus as recited in claim 53, wherein the logic is further cooperatively configured to implement at least one feature-based algorithm that uses at least one feature selected from a group of features including at least one Haar-like feature, at least one extended feature, at least one mirror invariant feature, and at least one variance features.

67. The apparatus as recited in claim 53, wherein the logic is further operatively configured to perform in-plane estimation that detects an orientation of the face image data, and up-right face detection based on the in-plane estimation, wherein the up-right face detection identifies out-plane rotation variations of the face image data.

68. The apparatus as recited in claim 63, wherein the logic is further configured to selectively crop at four sub-band portions.

* * * * *

UNITED STATES PATENT AND TRADEMARK OFFICE
CERTIFICATE OF CORRECTION

| | | |
|---|---|---|
| PATENT NO. | : 7,689,033 B2 | Page 1 of 1 |
| APPLICATION NO. | : 10/621260 | |
| DATED | : March 30, 2010 | |
| INVENTOR(S) | : Rong Xiao et al. | |

It is certified that error appears in the above-identified patent and that said Letters Patent is hereby corrected as shown below:

In column 18, line 63, in Claim 3, after "method" insert -- as --.

In column 18, line 65, in Claim 3, delete "comprising, mangle" and insert -- comprising a rectangle --, therefor.

In column 19, line 5, in Claim 5, after "feature," insert -- an --, therefor.

In column 19, line 9, in Claim 7, after "method" insert -- as --.

In column 20, line 8-9, in Claim 21, delete "portion." and insert -- portions. --, therefor.

In column 20, line 11, in Claim 22, delete "portion." and insert -- portions. --, therefor.

In column 20, line 43, in Claim 34, delete "[45°,45°]." and insert -- [-45°,45°]. --, therefor.

Signed and Sealed this
Twenty-second Day of February, 2011

David J. Kappos
*Director of the United States Patent and Trademark Office*